United States Patent [19]

Blake

[11] 4,244,981

[45] Jan. 13, 1981

[54] NON-DAIRY, AERATED FROZEN DESSERT CONTAINING CITRUS JUICE VESICLES

[75] Inventor: Jon R. Blake, Brooklyn Center, Minn.

[73] Assignee: General Mills, Inc., Minneapolis, Minn.

[21] Appl. No.: 44,798

[22] Filed: May 31, 1979

[51] Int. Cl.$^2$ .......................... A23G 9/02; A23G 9/04
[52] U.S. Cl. .................................. 426/567; 426/565; 426/616
[58] Field of Search ............... 426/333, 616, 639, 658, 426/660, 661, 506, 519, 523, 810, 327, 564, 565, 567, 524

[56] References Cited

U.S. PATENT DOCUMENTS

| | | | |
|---|---|---|---|
| 2,651,575 | 9/1953 | Talburt et al. | 426/565 X |
| 2,858,221 | 10/1958 | Laurie | 426/616 |
| 2,865,757 | 12/1958 | Aurell | 426/558 X |
| 2,952,548 | 9/1960 | Work | 426/302 X |
| 3,190,756 | 5/1965 | Aurell | 426/653 X |
| 3,196,020 | 7/1965 | Work | 426/302 |
| 3,246,992 | 4/1966 | Noznick et al. | 426/567 |
| 3,246,993 | 4/1966 | Webster et al. | 426/616 |
| 3,365,310 | 1/1968 | Webster | 426/616 |
| 3,434,848 | 3/1969 | Katz | 426/564 |
| 3,503,757 | 3/1970 | Rubenstein | 426/565 X |
| 3,535,122 | 10/1970 | Mussellwhite | 426/565 |
| 3,814,816 | 6/1974 | Gunther | 426/46 |
| 3,889,001 | 6/1975 | Buide et al. | 426/565 |
| 3,922,371 | 11/1975 | Julien | 426/565 |
| 3,949,102 | 4/1976 | Hellyer | 426/565 X |
| 3,968,266 | 7/1976 | Baugher | 426/524 X |
| 3,998,977 | 12/1976 | Rabeler | 426/616 X |
| 4,096,286 | 6/1978 | Sakakibara et al. | 426/577 |
| 4,117,176 | 9/1978 | Taylor et al. | 426/660 |
| 4,120,987 | 10/1978 | Moore | 426/572 |
| 4,140,807 | 2/1979 | Braverman | 426/660 X |
| 4,145,454 | 3/1979 | Dea et al. | 426/565 |

OTHER PUBLICATIONS

Ting, "Alcohol-Insoluble Constituents of Juice Vesicles of Citrus Fruit"; *Journal of Food Science*, vol. 35, pp. 757-761 (1970).

Nagy et al., "Fatty Acids of Triglyceride from Citrus Juice Sacs", *Phytochemistry*, vol. 13, pp. 153-154 (1974).

Nagy et al., "Saturated & Mono-Unsaturated Long Chain Hydrocarbon Profiles of Lipids from Orange, Grapefruit, Mandarin & Lemon Juice Sacs", *Lipids*, vol. 7, No. 10, pp. 666-670 (1972).

Kesterson, "Processing & Potential Uses for Dried Juice Sacs", *Food Technology*, pp. 52-54, Feb. 1973.

*Primary Examiner*—Arthur L. Corbin
*Attorney, Agent, or Firm*—Gene O. Enockson; John A. O'Toole

[57] ABSTRACT

Disclosed are non-dairy dessert compositions which are free of conventional emulsifiers and which are heat shock stable. The compositions comprise from about 50% to 98% of a specially prepared comestible base, from about 0.4% to 4% of an acid-stable whipping agent, from about 0.05% to 0.5% of an acid stable polysaccharide gum and from about 1% to 15% of an edible fatty triglyceride oil. The moisture content of the dessert compositions ranges between 48% and 65%. The comestible base is prepared by forming an uncooked blend comprising from about 25% to 65% by weight of the blend of citrus juice vesicles, from about 7% to 45% of a nutritive carbohydrate sweetening agent, from about 1% to 5% of an ungelatinized starch, from about 0.1% to 0.4% of water-soluble pectin, from about 8% to 60% by weight of water and sufficient non-volatile edible organic acid to provide the blend with a pH between 2.5 and 5.5. The blend is then cooked to a viscosity (190° F.) between 7,000 and 10,000 cp. and a moisture content between 30% to 60%. An aerated frozen dessert is prepared by aerating the mixture of these ingredients to a density of 0.2 to 0.95 g./cc. and then statically freezing the aerated mixture.

20 Claims, No Drawings

NON-DAIRY, AERATED FROZEN DESSERT CONTAINING CITRUS JUICE VESICLES

BACKGROUND OF THE INVENTION

1. Field of the Invention

The present invention relates to aerated, non-dairy, frozen desserts and to methods of their preparation. More particularly, the present invention in its product aspect relates to frozen dessert compositions containing citrus juice vesicles. In its method aspect, the present invention relates to a method of preparing an aerated, frozen dessert by aerating a dessert composition and thereafter statically freezing the aerated dessert composition to realize the present aerated frozen desserts.

2. The Prior Art

A wide variety of dessert compositions are known from which frozen desserts can be prepared. Such compositions can be divided into dairy-based compositions (e.g., ice cream, some sherberts, etc.) and non-dairy based compositions (e.g., fruit ices). Non-dairy based frozen desserts are characterized in part by an absence of any milk-derived components including milk or butter fat, non-fat milk solids or even milk derived proteins such as whey solids or caseinate. Non-dairy frozen desserts can be further divided into aerated or aeratable compositions such as fruit ices on the one hand, and non-aerated compositions such as popsicles, on the other.

It is apparent that it would be desirable to be able to make high quality non-dairy aerated frozen products from a shelf-stable mix by simply whipping with a home mixer and then statically freezing the aerated mixture in the freezing compartment of the home refrigerator without requiring home ice cream-making apparatus. "Statically freezing" refers to the process step of freezing without concurrent agitation or aeration. Statically freezing desirably eliminates the need for special home freezing apparatus as well as the extra mixture transfer from mixing bowl to freezing apparatus and then to storage or serving containers.

However, there are many difficulties inherent in the preparation of non-dairy aerated frozen desserts which are made by a process involving static freezing. Generally, frozen desserts made by static freezing do not compare favorably in consistency and overall appearance to conventional frozen desserts made by the normal commercial process involving agitation during the freezing step. Ordinarily, if frozen dessert formulations are not agitated during freezing, large ice crystals are formed. Also, the fat phase will tend to separate from the other components of the mix yielding a non-homogeneous product. Such results adversely affect texture, mouthfeel and uniformity of appearance of the frozen dessert thereby affecting the overall quality of the product.

It would be even more desirable if such non-dairy aerated frozen desserts which are prepared by static freezing could be "heat shock" stable. The term "heat shock" is used herein to refer to a partial warming of the frozen product followed by a return to normal storage temperatures which tends to produce a gritty texture due to ice crystal growth. Heat shock instability problems are typically more severe for frozen desserts prepared by static freezing compared to frozen desserts prepared by conventional agitated freezing methods. Such instability problems are even more severe for non-dairy frozen desserts which lack the stabilizing influence of natural, milk lacto-protein emulsifiers.

Past efforts have included attempts at realizing dairy based compositions which can be statically freezing to form frozen desserts and which are fully "freeze-thaw" stable. However, these compositions have employed specifically tailored emulsifier systems to achieve stabilization of the polyphasic emulsion as well as to control ice crystal growth during the static freezing step. Such compositions, however, are not without disadvantages. The specifically tailored emulsifier/stabilizer system is typically expensive. Moreover, such emulsifier stabilization systems are subject to degradation in emulsifier functionality upon extended storage. Also, the heat shock stability of such products could be improved. Finally, such compositions require the presence of milk-based components.

Accordingly, it is an object of the present invention to provide a non-dairy dessert composition which upon aeration and subsequent static freezing exhibits the desirable dessert attributes of mouthfeel, body, and texture which are reminiscent of commercial ice cream.

It is a further object of the present invention to provide non-dairy dessert compositions which are substantially free of conventional emulsifiers as well as substantially free of specifically tailored emulsifier/stabilizer systems.

It is a further object of the present invention to provide non-dairy dessert compositions which are substantially free of emulsifiers which nonetheless can be statically frozen.

It is a further object of the present invention to provide such statically freezable compositions which exhibit enhanced heat shock stability.

It is a further object of the present invention to provide such compositions to which can be added substantial amounts of fruit based components.

It has been surprisingly discovered that the above-objectives can be realized and superior non-dairy aerated frozen desserts prepared from dessert compositions comprising a specially prepared comestible base, water, a fatty triglyceride oil, minor amounts of an acid-stable whipping agent and an acid-stable polysaccharide gum.

The present, particular comestible bases which are the principal ingredients of the present dessert compositions are prepared in accordance with the disclosure given in the concurrently filed application, Ser. No. 043,993. Such comestible bases are prepared by cooking in prescribed manner uncooked blends which comprise nutritive carbohydrate sweetening agents, ungelatinized starch, edible non-volatile organic acids and, principally, citrus juice residual juice vesicles.

Citrus juice residual juice vesicles are a by-product of commercial citrus juice preparation. Juice vesicles can be obtained from the finer materials (i.e., pulp) associated with the juice which is segregated from the juice by screening. A variety of terms have been loosely used in the art to refer to this pulp material or parts thereof at various times in its treated or untreated forms. It has been called at various times in its untreated state, "juice vesicles", "juice sacs" or "finisher pulp". The juice vesicles are membranes forming the juice sacs of the citrus fruit. During juicing operations, the juice sacs rupture and release their juice. Thus, for purposes of the present invention, "juice vesicles" is used synonymously for the residual citrus juice sac materials remaining after the release of the juice from the juice sac.

Citrus juice vesicles comprise from about 90% to 96% by weight of water. Thus, most attempts at utilizing this material have involved drying the vesicles to a low moisture content. For example, the finisher pulp from commercial juice production is typically combined with peel residual and the mixture is then dried and sold for cattle feed. In some instances, the pulp is recovered frozen and then freeze dried to be used in dry juice powders which form orange juice drinks when reconstituted with water (see, for example, U.S. Pat. No. 3,246,993 issued Apr. 19, 1966 to R. C. Webster et al and U.S. Pat. No. 3,365,310 issued Jan. 20, 1968 to R. C. Webster). Both washed and unwashed juice vesicle material which has been drum dried, spray dried or solvent dried has been suggested for use as a food additive. Such suggested utilization is based upon the excellent water-binding and the good oil-binding properties of the dried material. One reference (see, "Processing and Potential Uses for Dried Juice Sacs", by J. W. Kesterson and R. J. Braddock, *Food Technology*, February, 1973, pp. 52–54) suggests its utilization in a wide variety of food products but has no teaching of any use in any food product.

In contrast, the present invention does not use dried juice sacs. Even upon rehydration, dried juice sacs exhibit unsuitably different functionality compared to "raw" juice vesicles which are suitable materials for the present compositions. Inclusion of "raw" juice pulp appears to have been limited to simple, non-treated, frozen compositions such as are disclosed in U.S. Pat. No. 2,858,221 (issued Oct. 28, 1958 to D. C. Laurie).

SUMMARY OF THE INVENTION

The present invention relates to dessert compositions which upon aeration can be statically frozen to provide aerated frozen desserts of good appearance and eating qualities and which are highly heat shock stable. The dessert compositions are spoonable even at deep freeze temperatures (e.g., 0° F.).

The present dessert compositions essentially contain from about 50% to 98% by weight of a specially prepared comestible base, from about 0.4% to 4% of an acid-stable whipping agent, from about 0.05% to 0.5% of an acid-stable polysaccharide gum, and from about 1% to 15% of an edible fatty triglyceride oil. The dessert compositions have moisture contents between about 48% and 65%. Upon aeration and freezing, the present frozen desserts have densities of about 0.2 to 0.95 g./cc.

The comestible base which forms the major portion of the present dessert compositions is prepared by forming an uncooked blend comprising citrus juice vesicles, a nutritive carbohydrate sweetening agent, ungelatinized starch, sufficient edible non-volatile acid to provide the blend with a final pH of between 2.5 to 5.5, and water. The water-soluble pectin content of the uncooked blend essentially ranges between about 0.1% to 0.4% by weight of the blend. The blend is then cooked at a temperature between about 180° F. to 280° F. to form a cooked comestible base characterized by a final moisture content of between 30% to 60% and a viscosity (190° F.) between 7,000 and 10,000 cp. The uncooked blend contains from about 25% to 65% by weight of the vesicles, from about 7% to 45% of the sweetening agent, from about 1% to 5% of the ungelatinized starch and from 8% to 60% by weight of the water.

Even though the present dessert compositions do not contain emulsifiers which are conventional in frozen desserts, the present dessert compositions are nonetheless highly resistant to heat shock and synerisis.

DETAILED DESCRIPTION OF THE INVENTION

The present invention relates to frozen dessert compositions containing juice vesicles. The present desserts are soft and spoonable even at typical freezer temperatures (i.e., 0° F.). The present frozen dessert compositions do not contain either emulsifiers or dairy-based components of conventional frozen desserts. The present frozen dessert compositions essentially consist of a specially prepared comestible base, an acid-stable whipping agent, an acid-stable polysaccharide gum, and a liquid fatty triglyceride oil. Each of these frozen dessert composition ingredients as well as product preparation and product use are described in detail below.

Throughout the specification and claims, percentages and ratios are by weight, and temperatures are given in degrees Fahrenheit, unless otherwise indicated.

A. Comestible Base

A comestible base containing citrus juice vesicles is the principal component of the present frozen dessert compositions. The present compositions essentially comprise from about 50% to 98% by weight of the comestible base. Better results are achieved when the present compositions contain from about 50% to 90% of the comestible base. Best results are achieved when the comestible base comprises from about 64% to 84% of the present compositions.

It is essential to the practice of the present invention that the comestible base is prepared according to the following method. The steps of the method of comestible base preparation include the step of making a blend of certain essential ingredients and thereafter cooking the blend in prescribed manner to provide the present comestible base.

I. Blend Preparation

A process blend is prepared essentially comprising the following:

a. Juice Vesicles

Citrus juice vesicles are the principal component of the presently prepared blend. After cooking the blend as described in detail below and combining the cooked comestible base with the other essential frozen dessert composition ingredients, the modified-by-cooking juice vesicles provide the structuring and bulk to the present frozen desserts. Moreover, the modified juice vesicles additionally serve to bind the present essential liquid triglyceride oil ingredient without requiring the utilization of conventional emulsifiers.

The juice vesicles are present in amounts of from about 25% to 65% by weight of the uncooked blend. Superior results in terms of structuring ability, for example, are achieved when the vesicles are present at from about 40% to 55%. Best results are obtained when the vesicles are present at from about 47% to 53% of the uncooked blend.

Juice vesicles generally contain about 89% to 96% moisture. Thus, when only the solid materials provided by the juice vesicles is considered, the juice vesicles comprise from about 2.5% to 6.5% of the present comestible base, preferably about 4.0% to 5.5% and most preferably from about 4.7% to about 5.3%.

As noted supra, the juice vesicles have been separated from the juice by simple screening in the manufacture of concentrated citrus juice. In commercial juicing operations, juice vesicles are typically washed with cold water to remove and to recover some of the soluble sugars prior to disposal. Some pectin-like materials are also washed out along with the soluble sugars leaving relatively pure juice vesicles. Optionally, the juice vesicles of the present invention are desirably stabilized or pasteurized by heating to 180° F. or higher for 0.25 hours or longer. Such heating also serves to inactivate pectillic enzymes present in the juice vesicles.

Citrus juice vesicles and their chemistry of composition are well known (see, for example, "Alcohol-Insoluble Constituents of Juice Vesicles of Citrus Fruit", by S. V. Ting, *Journal of Food Science*, Vol. 35, pp. 757–761. (1970); "Fatty Acids of Triglycerides From Citrus Juice Sacs", by S. Nagy and H. E. Nordly, *Phytochemistry*, Vol. 13, pp. 153–154 (1974); or "Saturated and Mono-Unsaturated Long Chain Hydrocarbon Profiles of Lipids From Orange, Grapefruit, Mandarin, and Lemon Juice Sacs", by S. Nagy and H. E. Nordly, *Lipids*, Vol. 7, No. 10, pp. 666–670 (1972), each of which is incorporated herein by reference).

A typical analysis of citrus juice vesicles useful in the present food composition is:

TABLE I

| Component | Percent (dry basis) |
| --- | --- |
| Crude fiber | 33.0% |
| Pectin | 36.0 |
| Sugar | 16.5 |
| Protein | 10.0 |
| Ash | 2.75 |
| Fat | 1.75 |
| | 100.00% |

Although the moisture content of juice vesicles are quite high, the water is tightly bound and not readily removed by mechanical means such as conventional filtration. Juice vesicles having moisture contents below about 89% obtained by partially thermally drying are not contemplated for use herein. While the precise phenomenon is not understood, it is believed that drying of the juice vesicles irreversibly alters their structures and composition and thus renders them unsuitable for use in the present comestible bases as prepared by the present preparation method. And too, attempts at substitution of juice vesicles in the present comestible bases by equivalent amounts of individual materials similar to the component analysis of Table I have not proven successful.

In a preferred embodiment of the present frozen dessert compositions, it is highly desirable to employ homogenized juice vesicles in the preparation of the comestible base ingredient. Homogenized juice vesicles can be prepared using conventional homogenization methods and apparatus. Generally, homogenizers are divided into two groups according to the kind of energy introduced into the medium homogenized: (1) rotor or rotor-stator systems, e.g., agitators, emulsifying pumps and colloid mills, and (2) pressure systems, e.g., wedge resonators and pressure homogenizers. The pressure homogenizers are predominantly used in food processing since they have the best homogenizing effects. Preferably, such units which are used in the preparation of the homogenized juice vesicles, usefully employed in the present comestible bases, are those homogenizers which are constructed to prevent contamination. Typically, juice vesicles are easily homogenized employing wide ranges of homogenization pressures, e.g., 1,000 to 8,000 p.s.i.g.

Unfortunately, homogenized juice vesicles are not readily amenable to analysis of their particle size distributions due to their partially dissolved/suspended nature and their high viscosity. Sufficient homogenization for the present invention is achieved, however, when the homogenized juice vesicles' taste perception is particle free or homogeneous, e.g., similar texturally to catsup. Mixtures of juice vesicles and the chemically similar material obtained from citrus fruit albedo can be homogenized to supply the homogenized juice vesicle component herein since the physical structure of neither the albedo material nor the juice vesicles is retained after homogenization.

Juice vesicles derived from citrus fruits are especially suitable for use herein. Preferably the vesicles are derived from oranges, but lemon, grapefruit, tangerine or mandarin juice vesicles can also be used.

b. Sweetening Agent

A nutritive carbohydrate sweetening agent is essentially present in the present uncooked blend at about 7% to 45%, preferably at from about 25% to 45%, and most preferably from about 35% to 42% by weight. The term "nutritive carbohydrate sweetening agent" is used herein to mean those typical sweetening agents conventionally used in food products. Of course, the present nutritive carbohydrate sweetening agents are to be distinguished from non-nutritive carbohydrate sweetening agents such as saccharin, cyclamate and the like. Additionally, the present carbohydrate sweetening agents are to be distinguished from such protein-based sweetening agents as aspartame, thaumatin and monellin.

Suitable materials for use as nutritive carbohydrate sweetening agents are well known in the art. Examples of sweetening agents include both monosaccharide and disaccharide sugars such as sucrose, invert sugar, dextrose, lactose, honey, maltose, fructose, maple syrup and corn syrup solids. Preferred nutritive carbohydrate sweetening agents are those selected from the group consisting of sucrose, glucose, fructose, corn syrup solids and honey. Highly preferred nutritive carbohydrate sweetening agents are those selected from the group consisting of sucrose, corn syrup solids and fructose. Of course, mixtures of the above-noted materials are contemplated herein.

While the above-exemplified sweetening agents are available in highly purified forms, other sources of sweetening agents which are not as highly purified can be used. For example, a relatively inexpensive material such as apple juice powder (or apple powder as it is commercially labeled) which is approximately 70% by weight (dry basis) sugars can be employed as a nutritive sweetening agent. If used, such impure sources of sugars are employed at levels based upon their total sugars content. Up to 25% of the nutritive carbohydrate sweetening agent used herein can be supplied by such impure sweetening agents.

c. Acidulants

An edible non-volatile organic acid is another essential ingredient of the uncooked blend. The edible organic acid serves to provide the uncooked blend with a pH of from about 2.5 to about 5.5, preferably from about 3.0 to 4.3 and most preferably from about 3.8 to about 4.2. Maintenance of the pH of the present uncooked blend within the above-noted range is essential to the complex vesicle-starch interaction of the present method of preparation. Typically, edible organic acids are employed at levels of from about 0.3% to 4% by weight of the present comestible bases.

The present method of comestible base preparation involves cooking the uncooked blend at elevated temperatures for extended periods. Thus, it is essential that the acidulants remain in the blend during the cooking operation rather than being lost through vaporization. Accordingly, the organic acids useful herein should be non-volatile. For purposes of the present invention, "non-volatile" shall mean having a vapor pressure at 280° F. of less than about 50 Torr.

A wide variety of edible, non-volatile organic acids or their sodium salts are known in the food art and are usefully employed herein. Examples of suitable materials useful herein as edible organic acids include a citric acid, succinic acid, tartaric acid, malic acid, lactic acid, itaconic acid and adipic acid. Preferred edible non-volatile organic acids or their salts include sodium citrate and sodium succinate.

d. Ungelatinized Starch

The present uncooked blends also essentially comprise from about 1% to 5% of ungelatinized starch. Better compositions contain from about 1.5% to 3% ungelatinized starch. Best results are achieved when the starch level is about 2.0% to 2.8%.

Any ungelatinized starch is useful herein. Ungelatinized starch, of course, is starch in the form of granules in contradistinction to gelatinized starch, e.g., pregelatinized starch. Starch and its chemistry are well known (see, for example "Starch: Chemistry and Technology", Vol. 1 and 2, R. L. Whistler and E. F. Paschiall, 1965 and 1967, Academic Press, N.Y., incorporated herein by reference), and selection of suitable starch materials will pose no problem to those skilled in the art. Suitable ungelatinized starches include those derived from cereal grains such as corn, sorghum and wheat, and from roots and tubers including arrowroot, tapioca and potatoes. Highly preferred for use herein as the starch ingredient are thin-boiled starches. Thin-boiled starches are modified starches which are produced by treating aqueous suspensions of starch granules with mineral acid, and which have been neutralized, washed and then dried.

e. Water

The uncooked blend essentially comprises from about 8% to 60% water. Better comestible bases are prepared when the water is present in the uncooked blend at from about 40% to 55%. Best results are achieved when the water is present in the uncooked blend at from about 45% to 52% by weight.

The water which is added and comprises an essential component of the uncooked blend should, of course, be distinguished from the total moisture content of the uncooked blend. Since the juice vesicles comprise about 90% by weight bound water, the present uncooked blend would have high overall moisture levels even without the addition of the essential water component. However, as noted supra, the water associated with the juice vesicles is so tightly bound as to be unavailable for dissolution of the nutritive sweetening agents(s) or for hydration of the ungelatinized starch(s).

Conventional potable water can be used to supply the water component of the uncooked blend. Thus, the water should be clear, free of objectionable taste, colors and odors, and of approved bacteriological quality.

Preferably, the water component of the process blend is supplied by distilled water. Distilled water is characterized by reduced water hardness, i.e., lower concentrations of magnesium and calcium ions and reduced carbonates levels.

f. Water Soluble Pectin

The present blends essentially comprise from about 0.1% to 0.4% by weight water-soluble pectin. Preferably from about 0.1% to 0.35%. Best results are achieved when the water soluble pectin content ranges between about 0.2% to 0.35% by weight of the present blend. Water-soluble pectin is that mixture of water-soluble pectinic acids of varying methoxyl content and degree of neutralization. Water-soluble pectin is, of course, well known in the food art. (See, for example, 21 CFR 182.1775). The commercial preparation of pectin involves the extraction of plant materials rich in pectic substances with hot acidulated water or complexing agents, filtering of the extracts, and precipitation of the pectin with ethanol, isopropanol, or polyvalent salts. The clarified extract is also spray or roller dried or concentrated to give liquid pectin.

The citrus juice vesicles typically supply the comestible base with sufficient amounts of naturally occurring water-soluble pectins. However, highly washed juice vesicles may be deficient in water-soluble pectins due to the removal of these pectins during the washing operation. If insufficient levels of water-soluble pectin are supplied by the citrus juice vesicles, then the essential levels of water-soluble pectin must be supplied by the incorporation of additional amounts of water-soluble pectin.

Measurement of the level of essential water-soluble pectin can be made employing conventional gravimetric analytical techniques. A description of suitable test methods and aparatus is given, for example, in "Chemical Analysis of Food", Seventh Edition, by D. Pearson, pp. 149–150, Chemical Publishing Co., Inc., New York, N.Y. (1977) which is imcorporated herein by reference.

Upon completion of the cooking step which is described in more detail below, part of the crude fiber of the citrus vesicles has been converted from insoluble to soluble pectin. Thus, the cooked comestible base component of the present compositions typically will have water-soluble pectin levels of about 0.6% to 1.3% by weight of the cooked comestible base.

g. Optional Blend Ingredients

Optionally, the present blends can additionally contain from about 0.1% to 40% by weight of the blend of additional fruit material. The additional fruit material can include semi-moist fruit, fruit purees, and fruit nectars. The additional fruit material can serve to provide the comestible base with the flavor and color attributes characteristic of the optional fruit material. Thus, for example, the present comestible base can exhibit the flavor and color of blueberries if the present comestible bases comprise from about 5% to 25% of blueberry puree. Other suitable fruit material includes purees derived from apricots, apples, pears, grapes, peaches, strawberries, and raspberries and mixtures thereof.

Blend Preparation

The blend is prepared by mixing or blending together in any order the juice vesicles, sweetening agents, acidulants, ungelatinized starch and water in such a manner as to achieve a uniform blend. Preferably, the sweetening agent and acidulants are first added to water and aditated until dissolved. Thereafter, the vesicles can be added to the solution with mild agitation until a relatively uniform blend is achieved. Finally, the starch can be slowly added with more vigorous agitation until thoroughly dispersed to form the process blend. Of course, the blending should be done below the gelation temperature of the starch, i.e., less than about 140° F.

The texture of the blend so prepared and its viscosity depend upon the moisture level of the juice vesicles, the level of starch employed and the amount of water added to the process blend. Typically, however, the viscosity will range from about 3,000 to 6,000 cp. when heated to 190° F. as measured by a typical Brookfield viscometer.

Aberrations in viscosity readings due to attachment of some juice vesicles on the spindle of the viscometer can result in erroneous viscosity measurements. Accordingly, an alternate measure of the consistency of the comestible base is given herein in Bostwick Units. The Bostwick consistometer is an instrument commonly used in the food industry to measure the consistency of viscous materials by measuring the distance a material flows under its own weight along a level surface in a given period of time. This instrument is commonly used with food product manufactures who wish to measure the relative consistency of such products as catsup, jellies, preserves, baby foods, salad dressings and other semi-solid products.

The consistometer comprises a rectangular trough divided into two sections by a spring operated gate assembly. The smaller of the two sections serves as the "reservoir" for the material to be tested. The larger section, which takes up most of the trough, serves as the "trap" on which the product flows so that its consistency can be measured. This section is graduated along the bottom in 0.5 cm. divisions, beginning at the gate, over a length of 24 cm.

The gate which divides the trough into two sections rests in the grooves of the two posts extending upward from the sides of the trough. Inside each post is a spring sufficiently compressed to maintain a strong upward force on the gate. While the reservoir is being filled, the gate is held down in a closed position. Pressing at the free end of the trigger releases the gate instantaneously and the gate flies up because of the spring force. Upon opening the gate, the fluid material flows along the bottom of the trough. The furthest linear extent of the material flow within a specified time is measured in Bostwick units having the dimensions of centimeters. Further information on the Bostwick apparatus and measurement methods is given in "Consistency Tests made by T. E. A. Garden on Preserves", Western Canner and Packer, Feb. 1939, which is incorporated herein by reference.

The present uncooked blends will have Bostwick flow viscosities or consistencies between about 10 and 14 cm. when heated to 190° F. As with the alternate viscosity measurement, the Bostwick viscosity will depend on the moisture level of the juice vesicles, the level of ungelatinized starch employed and the amount of water added to the process mix.

II. Cooking

The uncooked blend as prepared above is then cooked in the present method of comestible base preparation. It is speculated herein that during the cooking step, numerous complex and inter-related reactions occur including gelatinization of the starch, partial coating of the starch onto the fibrous portions of the juice vesicles, conversion of some insoluble pectin into soluble pectins, solids concentration increase and sugars reduction and conversion. Due to the extremely complex nature of these various reactions, for purposes of the present invention, the cooking steps's completion is defined by and determined by two criteria: (1) final moisture content of the comestible base, and (2) the viscosity of the comestible base.

The final moisture content of the comestible bases herein ranges between about 30% to 60%. Better results are achieved when the final moisture contents range between 45% and 55%. Best results are obtained when the moisture contents range between 48% and 53%.

Moisture is removed from the blend during the present cooking step. The rate of moisture removal is influenced by the pressure and the temperature at which the cooking step is practiced as well as the starch level and the level of water employed to form the uncooked blend. Generally, longer cooking times are required to achieve the essential final moisture content of the comestible bases when lower cook temperatures and higher water additions to the uncooked blend are used.

The temperature of the process mix during cooking should range between 180° F. to 280° F. For better results, the cooking temperature should range from about 205° F. and 280° F. Maintenance of the cooking temperature within the above-recited ranges is important to completion of the cooking step within a reasonable time as well as avoidance of ingredients degradation. Maintenance of the cooking temperature within the essential ranges is also important to the various interactions of the process blend components and, thus, the properties of the present comestible bases.

The cooking step can be performed at atmospheric pressure. Alternately, the cooking step can be performed under pressure. When pressurized cooking is employed, cooking pressures should be less than about 90 p.s.i.g. and preferably less than about 50 p.s.i.g. Of course, when pressurized cooking is used, the pressure cooking apparatus will be equipped with suitable means for moisture removal.

The combination of high cooking pressures and high cooking temperatures substantially reduces the cooking time required to achieve requisite final moisture contents and viscosities. Accordingly, time, per se, is not a critical process parameter of the present cooking step.

The completion of the present cooking step is also determined by the viscosity of the final comestible base. The viscosity of the cooked comestible bases at 190° F. will range between 7,000 to 10,000 centipoise. For better results, the viscosity will range between about 7,000 and 9,000 cp. Best results are obtained when comestible base has a viscosity of between about 7,000 and 8,000 centipoise.

The viscosity of the uncooked blend will generally increase during the cooking step by which the present comestible bases are prepared. The final viscosity of the comestible bases is influenced by the amount of juice vesicles used in the process mix as well as the vesicles' moisture content, the level and type of ungelatinized starch employed, the amount of water added to the uncooked blend, the final moisture content of the comestible base and the temperature and time of the cooking step. Generally higher viscosities are obtained when higher amounts of juice vesicles having lower moisture content are used, higher starch levels, longer cooking times at higher temperatures, and lower final moisture levels of the comestible base. Conversely, lower viscosities are obtained when shorter cooking times at lower temperatures, lower starch levels, higher final moisture contents, lower levels of juice vesicles of higher moisture contents are employed.

For convenience, the final viscosities of the cooked comestible bases prepared by the present method of preparation are alternatively stated in Bostwick units. Thus, the comestible bases of the present invention prepared by the present method have Bostwick viscosities of between 7 and 11 at 190° F. Better comestible bases have viscosities of about 7.5 to 10 Bostwick units. For best results, the comestible bases have a viscosity of between about 9.0 and 10 Bostwick units.

B. Whipping Agent

The present dessert compositions also essentially contain from about 0.4% to 4% of an acid-stable whipping agent. Better results are obtained when the present compositions contain from about 0.6% to 1.0% of the whipping agent. By "acid-stable" it is meant herein that the presently employable whipping agents be able to aerate the present frosting compositions, which have a pH ranging from about 2.5 to 5.5, to densities of between about 0.2 to 0.95 g./cc. when the whipping agent is present within the above specified range.

Whipping agents are well known in the food art and selection of suitable materials for use herein as the acidstable whipping agent will pose no problem to the skilled artisan. Suitable materials can be derived as protein hydrolyzates from, for example, caseinate, whey (see, for example, U.S. Pat. No. 4,089,987 issued May 16, 1978 to P. K. Chang) and various vegetable proteins. The protein hydrolyzates employed herein are water soluble (i.e., soluble at least to about 20% by weight at 25° C. throughout the pH range of about 2.0 to 10.0). The soy protein hydrolyzates disclosed in U.S. Pat. No. 3,814,816 (issued June 4, 1974 to R. C. Gunther, incorporated herein by reference) are particularly effective whipping proteins. These proteins are commercially available from Staley Mfg. Co., Decatur, Ill., and may be prepared by initially chemically hydrolyzing the soy protein to a prescribed viscosity range and thereafter enzymatically hydrolyzing the soy protein with pepsin to produce a pepsin modified hydrolyzed soy protein whipping agent.

C. Acid-Stable Polysaccharide Gums

The present dessert compositions also essentially comprise an acid-stable polysaccharide gum. The term "acid-stable" when used herein with reference to the polysaccharide gums indicates that the viscosity of gum dispersions of specified gum level at specified temperatures are little effected by the pH of the dispersion. More specifically, the term "acid-stable" is used to indicate that aqueous gum dispersions will vary in viscosity less than about 25% throughout the pH of the present food compositions, i.e., between about 2.5 to 5.5 at room temperature (25° C.).

The physical and chemical properties of edible polysaccharide gums are well known in the food art and selection of specific acid-stable gums will pose no problem to the skilled artisan (see, for example, "Gum Technology in the Food Industry", M. Glicksman, Academic Press, N.Y., 1969; "Food Colloids", ed. by H. D. Graham, Avi Publishing Co., Westport, CT, 1977; and "Industrial Gums", R. L. Whistler 2nd ed., Academic Press, N.Y., 1973; each of which is incorporated herein by reference). Preferred gums for use herein are selected from the group consisting of guar gum, locust bean gum, xanthan gum and mixtures thereof. Best results in terms of mouthfeel, syneresis inhibition and aeration stability are realized when the polysaccharide gum is xantham gum.

The present polysaccharide gums are essentially present in the present dessert compositions at from about 0.05% to 0.5%. Better results are obtained when the gums are present at from about 0.1% to 0.3%.

Particular gum utilization levels will depend upon the total moisture in the present compositions, the particular gum(s) employed and the organoleptic properties desired in the present food compositions upon aeration. Generally, however, higher gum utilization levels will be employed with higher composition moisture contents. Gum levels will also influence the desired density of the aerated frozen dessert. Compositions of the present invention containing higher gum levels will generally provide frozen desserts exhibiting lower, fluffier densities upon aeration.

D. Edible Triglyceride Oil

The present dessert compositions essentially comprise from about 1% to 15%, preferably between about 6% to 10% by weight of the composition of an edible fatty triglyceride oil. Maintenance of the edible oil level within the above ranges is important to the provision of frozen desserts having a desirably rich mouthfeel. Further, excessively high oil levels can result in frozen desserts which are unspoonable at freezer temperatures (e.g., 0° F.) due to the dominance of the fat phase's physical properties at such temperatures.

Suitable oils should be bland in taste, i.e., deodorized. Preferred oils are additionally light in color, i.e., having a Gardener color scale value of less than four. Preferably the present oils are winterized. Winterization is the common oil process whereby higher melting fractions are removed from edible oils to avoid clouding at refrigeration temperatures.

The present edible oils can be derived from any of the naturally occurring liquid glyceridic oils such as soy bean oil, cottonsead oil, peanut oil, sesame seed oil, and sunflower seed oil. Also suitable are liquid oil fractions obtained from palm oil, tallow, as for example, by graining or directed interesterification, followed by separation of the oil. Other suitable edible oil materials and methods of edible oil preparation are described in detail in Bailey "Industrial Oil and Fat Products", (3rd Ed. 1964) which is incorporated herein by reference.

E. Moisture Content

The total moisture content of the present dessert compositions essentially ranges between 48% and 65%. Better results in terms of spoonability at reduced temperatures and heat shock stability, for example, are obtained when the moisture content of the present dessert compositions range between about 54% and 60%. Of course, the moisture contents of the present dessert compositions are to be distinguished from the essential, final moisture contents of the comestible bases which are an essential component thereof.

Typically, most, if not all, of the water is supplied by the comestible base component. However, when comestable bases having low final moisture components are employed in the present dessert compositions, additional water must be employed so that the moisture content of the dessert composition is within the above-given essential range.

F. Optional Ingredients

The present dessert compositions can optionally contain a variety of additional ingredients suitable for rendering such compositions more organoleptically or aesthetically desirable or more nutritious. Such optional components include, for example, flavors, coloring agents, nuts, vitamins, preservatives and the like. If present, such minor optional components should comprise from about 0.1% to 2.5% of the dessert compositions.

Composition Packaging

Several packaging systems are contemplated to deliver the dessert compositions to the consumer. One packaging embodiment comprises three packets or pouches. One pouch would contain the comestible base, a second would contain the edible oil and a third packet would hold the remaining essential and optional ingredients, i.e., the whipping agent and polysaccharide gum. A second packaging embodiment would contain only a two pouch kit. One pouch would hold the edible oil while the other would contain the balance of the essential and optional ingredients. In each embodiment, however, the edible oil and comestible base components are segregated. Prolonged contact between the edible oil and the comestible base at the higher temperatures of shelf storage can result in the oil developing hydrolytic rancidity. The two pouches individually are shelf-stable and can be stored for an extended period of time.

Composition Use

It is contemplated that the consumer would purchase the two or three pouch kits and then proceed to mix the ingredients of the pouches at his convenience. The resulting mixture is then aerated by whipping with a home mixer at for example, high speed for about 1 to 5 minutes. Aeration should be continued until about 50% to 150% overrun is achieved. The overrun refers to the percentage of increase in volume of the mixture. Such aeration insures the provision of frozen desserts having densities similar to those of ice cream, ice milk, or an ice cream shake. These densities range from 0.2 to 0.95 g./cc. with a density of about 0.35 to 0.50 g./cc. being preferred.

The aerated mixture is then cooled to below a temperature of about 8° F. to harden the dessert. While it is contemplated that the dessert will be consumed in its hardened or frozen form, it is an advantage of the present invention that the product is heat-shock stable. Thus, the aerated mixture may be frozen, withdrawn from the freezer and allowed to warm for example one hour, and statically refrozen to form a dessert of equivalent organoleptic attributes.

Of course, the dessert compositions of the present invention can be prepared by mixing, aerating, and concurrently freezing using conventional aerated frozen dessert freezers. However, whether prepared at home by the consumer employing static freezing or prepared commercially prior to eventual sale, the present aerated frozen dessert compositions can be stored for extended periods at 0° F. without the development of large ice crystals.

Another advantage of the present aerated frozen desserts is the relative absence of moisture loss or moisture migration from the desserts. Thus, such articles as frozen "ice cream" sandwiches or frozen pies can be realized which are not subject to immediate sandwich wafer or pie crust softening due to moisture migration from the dessert body. Of course, upon extended storage in unsealed containers, the ambient moisture in any freezer will serve to soften the wafer or pie crust if stored for long periods of time. Thus, for example, in the preparation of parfaits, alternate layers of the present aerated frozen desserts can serve to insulate the other layers from moisture migration therebetween.

Still another advantage of the present compositions is that no tempering is required prior to serving. Most frozen desserts require, upon removal from the freezer, a period of time in order for them to come up to a serving temperature before they are servable. The present aerated frozen dessert products, however, can be cut, spooned, etc. at freezer temperatures and therefore need no tempering. As a result of the ability to be consumed at freezer temperatures without temperature increases due to tempering, the present aerated frozen desserts exhibit enhanced coldness perceptability.

The aerated frozen dessert compositions of the present invention are illustrated by the following examples:

EXAMPLE I

A non-dairy aerated frozen dessert of the present invention is prepared having the following composition:

| Amount | Ingredient | Weight % |
| --- | --- | --- |
| 300 g. | Comestible base | 71.59% |
| 75 | Water | 17.80 |
| 40 | Triglyceride Oil[1] | 9.55 |
| 2 | Whipping Agent[2] | 0.49 |
| 1.6 | Vanilla Flavor | 0.47 |
| 0.4 | Xanthan Gum | 0.10 |
| 419 g. | | 100.00% |

[1]Crisco Oil (The Proctor and Gamble Co.)
[2]Gunther D-100WA manufactured and sold by A.E. Staley Manufacturing Co. (62% protein, 16% carbohydrate, 24% moisture): a water-soluble soy protein hydrolyzate.

The comestible base is prepared in the following manner:

An uncooked blend having the following formulation is prepared:

| Amount | Ingredient | Weight % |
| --- | --- | --- |
| 830 g. | Citrus juice vesicles[1] | 42.8% |
| 620 | Sucrose | 32.0 |
| 41 | Ungelatinized starch[2] | 2.1 |
| 1 | Citric Acid | 0.05 |
| 450 | Water | 23.05 |
| 1,942 g. | | 100.00% |

[1]Juice vesicles obtained from orange juice having an average moisture content of 90% by weight of the juice vesicles.
[2]An ungelatinized modified thin-boiled starch marketed by Hubinger as "Thin-Boil 60"

Such a formulation is prepared by first preparing a dry mix of the sugar, starch and the acid. Then, the unhomogenized juice vesicles are mixed with water in a sauce pan with mild agitation to form a wet mix. The agitation is continued while the dry mix is slowly added to the wet mix. Agitation is continued until the dry mix ingredients are completely dissolved thereby forming the uncooked blend. The blend is then heated with mild agitation to 190° F. A 250 g. sample is taken and analyzed for acidity, for water-soluble pectin content and for both Brookfield and Bostwick viscosity, and returned to the blend. The pH of the uncooked blend is 4.0 while the Brookfield viscosity was 4000 cp. and the Bostwick viscosity was 14 centimeters (1 min. flow). The water-soluble pectin content is 0.35%.

The blend is then heated to about 200° F. and cooked in open air to form the comestible base. Samples are periodically withdrawn, analyzed and returned to the blend until the viscosity of the comestible base is about 9,000 cp. at 190° F. Viscosity measurements are taken using a Brookfield HA Viscometer with a No. 3 spindle at 10 RPM. A cooking time of about 40 minutes is required to obtain this viscosity. The comestible base is found to have a Bostwick consistometer value of 9.5 cm. at 190° F. (1.0 min. flow time). The moisture content of the cooked base is determined to be about 50%. The water soluble pectin content is 0.90%.

About 1500 g. of the comestible base so prepared is allowed to cool to room temperature before being admixed together with the other non-dairy aerated frozen dessert ingredients.

The comestible base is then admixed with the other essential and optional ingredients in a home mixer at low to medium speed for three minutes. Then, the mixture is whipped at high speed (about 850 RPM) for five minutes. The resulting aerated mixture has a density of about 0.41 g./cc. The aerated mixture is then placed in the freezing compartment of a refrigerator (0° F.) for about five hours.

The resulting product is an aerated frozen dessert which has the texture and appearance to commercial ice cream. The dessert is spoonable even upon immediate withdrawal from the freezer. The moisture content of the frozen dessert is about 53%.

Dessert compositions of similar physical and organoleptic properties are realized when in the Example I dessert composition the xanthan gum is replaced with an equivalent amount of locust bean gum, guar gum and mixtures of the gums.

EXAMPLE II

A non-dairy dessert composition of the present invention is prepared having the following composition:

| Amount | Ingredient | Weight % |
|---|---|---|
| 300 g. | Comestible base | 82.30% |
| 35 | Water | 9.68 |
| 20 | Triglyceride Oil[1] | 5.53 |
| 6 | Whipping Agent[2] | 2.13 |
| 0.2 | Guar Gum | 0.12 |
| 0.1 | Locust Bean Gum | 0.06 |
| 0.1 | Xanthan Gum | 0.06 |
| 0.1 | Natural Strawberry Flavor | 0.06 |
| 0.1 | F.D. & C. No.2 Red | 0.06 |
| 361.6 | | 100.00% |

[1]Durkex 25 marketed by Glidden-Durke, Inc.; a light, winterized oil comprising a partially hydrogenated soybean oil.
[2]A water soluble soy protein hydrolyzate (Gunther D-100 WA manufactured and sold by A.E. Staley Manufacturing Co.)

Such a dessert composition is prepared in a manner similar to that described in Example I except that the comestible base is prepared as described below. The aerated frozen dessert composition is determined to have a moisture content of about 50.8%.

The comestible base is prepared by first mixing the following formulation to form an uncooked blend:

| Amount | Ingredient | Weight % |
|---|---|---|
| 600 g | Citrus Juice Vesicles[1] | 30.73 |
| 500 | Sucrose | 25.60 |
| 120 | Corn Syrup[2] | 6.14 |
| 41 | Ungelatinized Starch[3] | 2.10 |
| 230 | Strawberry Puree[4] | 11.78 |
| 1 | Citric Acid | 0.05 |
| 1 | Potassium Sorbate[5] | 0.05 |
| 10 | (Pectin)[6] | 0.51 |
| 450 | Water | 23.04 |
| 1953 g | | 100.00% |

[1]Juice vesicles obtained from orange juice having an average moisture content of 91% by weight of the juice vesicles.
[2]A 71% solids solution (i.e., 37.6° Be).
[3]An ungelatinized wheat starch marketed by General Mills Chemicals, Inc. (a Henkel Co.) under the name of "Aytex".
[4]A partially dehydrated puree prepared from homogenized whole strawberries having a moisture content of about 30%.
[5]An optional mold growth inhibition ingredient.
[6]Citrus Pectin marketed by SunKist, 150 g rapid set pectin The juice vesicles are first homogenized at about 6,000 psi using a Cherry Burk homogenizer at 60° F. at a rate of 12 lb./hr. The homogenized juice vesicles having a consistency similar to a puree.

The homogenized juice vesicles are charged into an open Groen Kettle (apx. 40 gallon capacity) equipped with a swept surface type agitator and a steam jacket. The tap water is added to the kettle using moderate agitation. Next, the strawberry puree is added. Thereafter, the corn syrup is added to form a wet mixture.

Then, a dry blend comprising the starch, sucrose, water-soluble pectin, citric acid and potassium sorbate is added to the wet mixture with moderate agitation to form the uncooked blend. An analysis of the uncooked blend indicates the water-soluble pectin content is about 0.60% by weight of the uncooked blend.

The kettle is heated with low pressure steam until the uncooked blend is 190° F. The viscosity of the uncooked blend is determined to be about 4,200 cp.

The blend is then heated to about 240° F. and cooked with moderate agitation to form the comestible base. Samples are periodically withdrawn, analyzed and returned until the viscosity of the comestible base is about 9,500 cp. measured at 190° F. A cooking time of about 2½ hours is required to reach this viscosity. The comestible base is found to have a Bostwick consistency value of 9.5 cm. (60 sec. flow at 190° F.). The moisture content of the base is determined to be about 48% while the pH is about 4.0. The water activity as measured by a Beckman Model SMT is found to be 0.9. About 150 lb. of comestible base are produced by this procedure. Thus, about 50 lb. of water are removed from the blend during the cooking to realize the present comestible base. The comestible base so prepared can then be combined in appropriate amounts with the other essential and optional dessert ingredients to form the present dessert compositions.

The dessert composition so prepared is then whipped to a density of 0.40 g./cc. and packaged in quart-size containers. The resulting quart of aerated mixture is then statically frozen after placing in a freezer at 0° F. for about seven hours.

The resulting product is an aerated frozen dessert which has the texture and appearance of commercial strawberry ice cream. The product is spoonable even at 0° F.

The product is allowed to warm for one hour at room temperature with closed lids and returned to the freezer for 12–16 hours. This sequence of thermal shocking is repeated 6 times. Upon withdrawal of the product from the freezer, the product was spoonable. Taste tests indicated an absence of the formulation of ice crystals. Moreover, visual examination revealed no synerisis from the product.

EXAMPLE III

A tomato flavored non-dairy dessert composition of the present invention is prepared having the following composition:

| Ingredient | Weight % |
| --- | --- |
| Comestible Base (50% H₂O) | 66.7% |
| Distilled Water | 24.39 |
| Triglyceride Oil[1] | 8.62 |
| Whipping Agent[2] | 0.80 |
| Polysaccharide Gum[3] | 0.10 |
| Tetra sodium pyrophosphate | 0.03 |
| | 100.00% |

[1]Durbex 25
[2]Gunther D-100 WA
[3]"GFS": a composite of guar gum, locust bean gum and Xanthan gum marketed by Kelco (a division of Merck & Co., Inc.)

Such a dessert composition is prepared in a manner similar to that described in Example I except that the comestible base is prepared as described below. The aerated frozen dessert composition is determined to have a moisture content of about 58%.

The comestible base is prepared in a manner similar to that of Example II except that the following formulation is used to form the uncooked blend:

| Ingredient | Weight % |
| --- | --- |
| Orange citrus juice vesicles[1] | 21.95% |
| Tomato puree[2] | 23.35 |
| Cornsweet 42 | 26.40 |
| Sucrose | 12.90 |
| Aytex Starch | 2.15 |
| Citric Acid | 0.05 |
| Distilled H₂O | 13.20 |
| | 100.00% |

[1]90% average moisture content.
[2]10% solids

The blend prepared is determined to have a water-soluble pectin content of 0.3% and a pH of 4.0%. The blend is cooked until it obtains a viscosity of 10,000 cp. and a moisture content of 50%.

The dessert composition so prepared is then whipped to a density of 0.47 g./cc.

What is claimed is:

1. A non-dairy composition useful in the static-freezing preparation of a frozen dessert which is spoonable at freezer temperatures and which is heat-shock stable, comprising:
   A. from about 50% to 98% by weight of a comestible base prepared by:
      1. blending to form a blend
         a. from about 25% to 65% by weight of the base of citrus juice vesicles having a moisture content of between 89% to 96% by weight of the vesicles;
         b. from about 7% to 45% by weight of the base of a nutritive carbohydrate sweetening agent;
         c. sufficient edible non-volatile acid or sodium salt thereof to provide the base with a final pH ranging between about 2.5 to 5.5;
         d. from about 1% to 5% by weight of the base of an ungelatinized starch;
         e. from about 8% to 60% by weight of the base of water;
         said blend having a Brookfield viscosity of between about 3,000 to 6,000 cp. at 190° F. and a water soluble pectin content of between about 0.1% to 0.4%; and
      2. cooking the blend at a temperature of between 180° F. and 280° F. to form a cooked comestible base having;
         a. a moisture content of between about 30% to 60% by weight of the comestible base;
         b. a Brookfield viscosity of between 7,000 and 10,000 cp. at 190° F.;
   B. from about 0.4% to 4% by weight of an acid-stable whipping agent;
   C. from about 0.05% to 0.5% by weight of an acid-stable polysaccharide gum;
   D. from about 1% to 15% of an edible fatty triglyceride oil; and
   wherein the dessert composition has a moisture content of about 48% to 65%.

2. The non-dairy composition of claim 1 wherein the moisture content of the cooked comestible base component is between about 45% and 55% by weight of the base 3. The non-dairy composition of claim 2 wherein the citrus juice vesicles are derived from oranges.

4. The non-dairy composition of claim 3 wherein the blend contains from about 25% to 45% by weight of the nutritive carbohydrate sweetening agent and from about 1.5% go 3% by weight of the ungelatinized starch.

5. The non-dairy composition of claim 4 prepared by cooking the blend at a temperature between about 205° F. to 280° F.

6. The non-dairy composition of claim 5 wherein the citrus juice vesicles are homogenized at pressures of about 1,000 to 8,000 psi g.

7. The non-dairy composition of claim 6 wherein the comestible base component has a Brookfield flow viscosity of between about 7,000 to 9,000 cp. at 190° F.

8. The non-dairy composition of claim 7 wherein the whipping agent is present at from about 0.6% to 1% by weight.

9. The non-dairy composition of claim 8 wherein the acid-stable polysaccaride gum is present at from about 0.1% to 0.3% by weight.

10. The non-dairy composition of claim 9 wherein the acid-stable polysaccharide gum is selected from the group consisting of locust bean gum, xanthan gum, guar gum, and mixtures thereof.

11. The non-dairy composition of claim 10 wherein the edible non-volatile organic acid is selected from the group consisting of citric acid, succinic acid, tartaric acid, malic acid, lactic acid, itaconic acid and adipic acid.

12. The non-dairy composition of claim 11 wherein the cooked comestible base component has a moisture content of between about 48% to 53% by weight.

13. The non-dairy composition of claim 12 wherein the blend comprises from about 35% to 42% by weight of the nutritive carbohydrate sweetening agent and from about 2% to 2.8% by weight of the ungelatinized starch.

14. The non-dairy composition of claim 13 additionally comprising a fruit puree selected from the group consisting of apple puree, pear puree, grape puree, apricot puree, peach puree, strawberry puree, blueberry puree, raspberry puree and mixtures thereof, and wherein the composition's moisture content is between about 54% to 60% by weight.

15. The non-dairy composition of claim 14 wherein the cooked comestible base component has a Brookfield viscosity of between about 7,000 and 8,000 cp. at 190° F.

16. The non-dairy composition of claim 15 wherein the cooked comestible base is present at from about 50% to 90% by weight.

17. The non-dairy composition of claim 16 wherein the citrus juice vesicles comprise from about 40% to 55% of the blend.

18. The non-dairy composition of claim 17 wherein the blend is cooked to a moisture content of between about 45% to 55% by weight of the comestible base.

19. The non-dairy composition of claim 18 wherein the edible fatty triglyceride oil is present at from about 6% to 10% by weight of the composition.

20. A process of preparing a frozen dessert which is spoonable at freezer temperatures and which is heat shock stable, comprising the steps of whipping, to a density of between about 0.2 to 0.95 g./cc., a non-dairy dessert composition comprising:
A. from about 50% to 98% by weight of a comestible base prepared by:
 1. blending to form a blend
  a. from about 25% to 65% by weight of the blend of citrus juice vesicles having a moisture content between about 89% and 96% by weight of the vesicles;
  b. from about 7% to 45% by weight of the blend of a nutritive carbohydrate sweetening agent;
  c. sufficient edible non-volatile organic acid or sodium salt thereof to provide the blend with a pH ranging between about 2.5 to 5.5;
  d. from about 1% to 5% by weight of the blend of an ungelatinized starch;
  e. from about 8% to 60% by weight of the blend of water,
  said blend having a Brookfield viscosity of between about 3,000 to 6,000 cp. at 190° F. and a water soluble pectin content of between about 0.1% to 0.4%; and
 2. cooking the blend at a temperature of between 180° F. and 280° F. to form a cooked comestible base having
  a. a moisture content of between about 30% to 60% by weight of the comestible base;
  b. a Brookfield viscosity of between 7,000 and 10,000 cp. at 190° F.;
B. from about 0.4% to 4% by weight of an acid-stable whipping agent;
C. from about 0.05% to 0.5% by weight of an acid-stable polysaccharide gum; and
D. from about 1% to 15% of an edible liquid fatty triglyceride;
to form an aerated non-dairy dessert composition which has a moisture content of about 48% to 65%; and
statically freezing the aerated non-dairy dessert composition at a temperature of less than 8° F. to form a frozen, aerated non-dairy dessert composition.

* * * * *